United States Patent
Pfefferle

Patent Number: 5,342,591
Date of Patent: Aug. 30, 1994

[54] CATALYTIC METHOD

[76] Inventor: William C. Pfefferle, 51 Woodland Dr., Middletown, N.J. 07748

[21] Appl. No.: 661,386

[22] Filed: Feb. 26, 1991

Related U.S. Application Data

[62] Division of Ser. No. 273,343, Nov. 18, 1988, Pat. No. 5,051,241.

[51] Int. Cl.⁵ ............................................. B01D 53/36
[52] U.S. Cl. ............................. 423/210; 423/213.2; 423/212
[58] Field of Search ............... 423/212 C, 213.2, 210; 60/272

[56] References Cited

U.S. PATENT DOCUMENTS

| | | | |
|---|---|---|---|
| 3,644,098 | 2/1972 | De Palma | 23/288 F |
| 3,768,982 | 10/1973 | Kitzner | 23/288 F |
| 3,770,389 | 10/1973 | Kitzner | 23/288 F |
| 3,839,224 | 10/1974 | Yonehara | 252/443 |
| 3,910,850 | 10/1975 | Turner | 252/455 R |
| 4,359,862 | 11/1982 | Virk | 60/274 |
| 4,859,433 | 8/1989 | Pereira | 423/212 |

*Primary Examiner*—Gary P. Straub
*Assistant Examiner*—Timothy C. Vanoy
*Attorney, Agent, or Firm*—Kane, Dalsimer, Sullivan, Kucucz, Levy, Eisele and Richard

[57] ABSTRACT

A catalytic reactor for oxidation of carbonaceous fuels comprising at least one microlith catalytic element having flow channels with a flow path length no longer than about two times the diameter of the largest flow channel. The initial catalyst element is advantageouly electrically conductive to permit electrical heating.

12 Claims, 1 Drawing Sheet

CATALYTIC METHOD

This is a division of copending application Ser. No. 273,343, filed Nov. 18, 1988 now U.S. Pat. No. 5,051,241.

BACKGROUND OF THE INVENTION

1. Field of the Invention

This invention relates to improved catalytic reaction systems and to methods for catalytic reaction of carbon containing compounds. In one specific aspsect the present invention relates to quick lightoff, fast thermal response catalysts for use in catalytic exhaust gas reactors and in catalytic fuel combustion systems.

In one still more specific aspect, this invention relates to low thermal mass electrically conductive catalysts suitable for rapid electrical heating to operating temperature.

2. Brief Description of the Prior Art

Automotive emissions are still a major environmental problem in spite of the major advances brought about by the use of catalytic converters. One factor limiting the performance of catalytic converters is that pollution is not controlled during the thirty or so seconds required to bring the converter catalyst to its operating temperature. In present converters, warm-up is dependent on heating of the catalyst by hot engine exhaust gases. Although electrical heating could be utilized to preheat the catalyst prior to engine operation, the power and the time delay required with present catalyst structures, ceramic or metal, have been deemed unacceptable.

Subsequent to catalyst light-off, surface reactions on conventional monolithic catalysts such as are used in catalytic converters are mass transfer limited. Thus, the catalyst mass required for a given conversion level is much higher than if no mass transfer limitation existed at the given operating conditions. The high catalyst mass required for the required conversion level results in the relatively long heat-up times experienced, even with electrical heating. In addition, this mass transfer limitation is such that the conversion level of present automotive exhaust catalytic converters is limited to relatively low levels, typically not much more than about 95%, even with the relatively small catalyst channels sizes employed. Higher conversion levels would be advantageous.

The need to reduce catalyst warm-up time of the conventional ceramic monolith automotive catalysts to reduce emissions during the warm-up period has led to increased interest in metal monolith catalysts. However, merely substituting metal for ceramic in a conventional monolith structure yields catalysts which still have much too high a thermal mass. Although metal monoliths are electrically conductive and could therefore be electrically preheated, fast enough heat up times have not yet been demonstrated as feasible. Furthermore, thermal shock damage would likely be a problem if a conventional metal monolith were heated as rapidly as needed for elimination of start-up emissions. There is a critical need for a catalyst system which can control hydrocarbon emissions during initial engine operation.

For catalytic combustors the problem is not just emissions but the ability to function in certain applications. For example, an automotive catalytic combustor gas turbine must start in roughly the same time frame as present automotive engines.

The present invention provides catalysts and systems which make possible much more rapid warm-up of converter catalysts without electrical heating and near instantaneous electrical heating of catalysts in combustors and catalytic converters. Moreover, catalysts of the present invention enable much higher conversions and improved selectivity in many chemical conversion processes by virtue of improved mass transfer to and from the catalyst surface.

SUMMARY OF THE INVENTION

Definition of Terms

In the present invention the terms "monolith" and "monolith catalyst" refer not only to conventional monolithic structures and catalysts such as employed conventional catalytic converters but also to any equivalent unitary structure such as an assembly or roll of interlocking sheets or the like.

For the purposes of this invention, the terms "microlith" and "microlith catalyst" refer to high open area monolith catalyst elements with flow paths so short that reaction rate per unit length per channel is at least fifty percent higher than for the same diameter channel with a fully developed boundary layer in laminar flow, i.e. a flow path of less than about two mm in length, preferably less than one mm or even less than 0.5 mm and having flow channels with a ratio of channel flow length to channel diameter less than about two to one, but preferably less than one to one and more preferably less than about 0.5 to one. Channel diameter is defined as the diameter of the largest circle which will fit within the given flow channel and is preferably less than one nun or more preferably less than 0.5 mm. Microlith catalysts may be in the form of woven wire screens, pressed metal or ceramic wire screens or even pressed thin ceramic plates and have as many as 100 to 1000 or more flow channels per square centimeter. Flow channels may be of any desired shape. For wire screens, flow channel length is the wire diameter and thus advantageously may be shorter than 0.3 mm or even shorter than 0.1 mm.

The terms "carbonaceous compound" and "hydrocarbon" as used in the present invention refer to organic compounds and to gas streams containing fuel values in the form of compounds such as carbon monoxide, organic compounds or partial oxidation products of carbon containing compounds.

The Invention

It has now been found that use of the microlith catalysts of the present invention makes possible as much as a ten fold or more reduction in catalyst mass as compared to that required to achieve the same conversion in mass transfer limited reactions of hydrocarbons using conventional monoliths. It has been found that the specific mass transfer rate increases as the ratio of channel length to channel diameter of a monolith catalyst is reduced below about five to one or more preferably below about two to one and especially below about one to one. Mass transfer of reactants to the surface becomes sensitive to the inlet flow rate rather than being significantly limited by the diffusion rate through a thick laminar flow boundary layer as in conventional monolith catalysts, whether ceramic or metal. In such conventional automotive monolith catalysts, the amount of pollutants oxidized is essentially independent of exhaust gas flow rate and thus percent conversion decreases with increase in flow rate. In contrast, in the microlith catalysts of the present invention, the amount of reactants oxidized typically increases with increase in flow rate. Thus if the inlet flow velocity is high enough, the reaction rate can even approach the intrinsic kinetic reaction rate at the given catalyst temperature without imposing an intolerable pressure drop. This means that it is practical to design microlith fume abatement reactors for much higher conversion levels than is feasible with conventional catalytic converters. Conversion levels of 99.9% or even higher are achievable in a microlith automotive converter smaller in size than a lower conversion level conventional catalytic converter. Conversion levels high enough for abatement of toxic fumes are achievable in compact reactors.

With the short flow paths of catalysts of the present invention, pressure drop is low permitting the use of much smaller channel diameters for a given pressure drop, further reducing catalyst mass required. It has also been found that channel walls as thin as 0.1 mm or even less than 0.03 mm are practical with small channel diameters thus permitting high open areas even with such small channel diameters. Thus, as many as several thousand flow channels per square centimeter or even more are feasible without reducing open area in the direction of flow below sixty percent. Open areas greater than 65, 70 or even 80 percent are feasible even with high channel density microliths.

Inasmuch as heat transfer and mass transfer are functionally related, an increase in mass transfer results in a corresponding increase in heat transfer. Thus, not only is catalyst mass reduced by use of the microlith catalysts of this invention, but the rate at which an automotive exhaust catalyst is heated by the hot engine exhaust is correspondingly enhanced.

The reduced catalyst mass together with the increased heat transfer rate enables a microlith catalyst to reach operating temperature much sooner than would a conventional automotive catalyst. If placed sufficiently close to the engine exhaust manifold, a microlith catalyst element can even reach operating temperature in less than five seconds without electrical heating. Effective operating temperature for automotive exhaust microlith precious metal catalysts are as low as 650 or even as low as 550 degrees Kelvin. However, an important feature of microlith catalysts is that high enough operating temperatures are achievable prior to or during engine cranking to permit effective use of base metal catalysts. It has been found that a metal microlith composed of a high temperature alloy containing a catalytic element such as chromium, cobalt, copper, manganese, nickel or a rare earth metal is catalytically active if heated to a temperature of about 800 degrees Kelvin, a temperature readily achieved in less than one second with electrical heating. Many such alloys are commercially available and include Haynes alloy 25, Inconel 600, and even certain stainless steels. With metal microliths, alloy selection is often determined primarily by oxidation resistance at the maximum operating temperature required by the given application.

The mass of microlith catalyst elements can be so low that it is feasible to electrically preheat the catalyst an effective operating temperature in less than about 0.50 seconds if a thin channel wall electrically conductive catalyst, eg a metal microlith, is used. In catalytic combustor applications the low thermal mass of catalyst elements of the present invention makes it possible to bring a combustor catalyst up to a light-off temperature as high as 1000 or even 1500 degrees Kelvin in less than about five seconds by electrical heating and even in less than about one or two seconds using the power from a conventional automotive battery. Such rapid heating is allowable for microlith catalysts because sufficiently short flow paths permit rapid heating without the consequent thermal expansion resulting in destructive stress levels.

Typically, in automotive exhaust systems of the present invention the catalyst elements preferrably have flow paths of less than about one millimeter in length and may be less than about 0.1 millimeter in length with as little five high channel density elements required to greatly exceed the start-up performance of a 150 millimeter long conventional monolith. The short channels result in a low pressure drop even with channels as small as 0.25 millimeters in diameter. However, if particulates are present channel size must be large enough to avoid plugging. In catalytic combustor applications, where unvaporized fuel droplets may be present, flow channel diameter is often large enough to allow unrestricted passage of the largest expected fuel droplet. Therefore in catalytic combustor applications flow channels may be as large as 1.0 millimeters in diameter whereas in automotive catalytic converter applications, flow channel diameter often can be as small as 0.5 to 0.25 millimeters or even smaller. If desired, one, two or three microlith catalyst elements may be placed in front of a conventional monolith catalyst element to serve as a lightoff reactor for the monolith. This approach is useful for retrofit applications.

Although as few as one or two catalyst elements advantageously may be used in a given catalytic converter application to improve the cold start performance of conventional monolith catalysts, the low pressure drops possible with catalysts of the present invention makes possible to utilize a large number of small diameter elements, even as many as two hundred in a one inch length, such that the converter diameter is not significantly larger than the engine exhaust pipe. This makes it much easier to place the converter catalyst at the exit of or even in the engine exhaust manifold, resulting in even faster catalyst warm up without electrical heating, and allows use of screens of different composition to achieve both hydrocarbon and NOx control. In other fume abatement applications, the large number elements feasible means that it practical to achieve whatever conversion levels are needed, even as high as 99.999 or better.

Although this invention has been described primarily in terms of automotive emissions control, the high mass transfer rates of microlith catalysts offers higher conversions and improved selectivity in many catalytic conversion processes. In particular, microlith catalysts offer superior performance in highly exothermic reactions such as the conversion of methane and other hydrocarbons to partially oxidized species such as the conversion of methane to methanol or and the conversion of ethane to ethylene.

DETAILED DESCRIPTION OF THE INVENTION AND PREFERRED EMBODIMENTS

Figure 1:
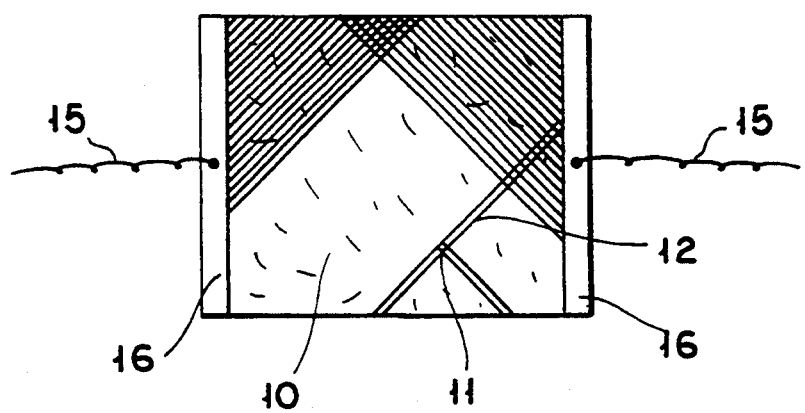
FIG. 1 shows a face view of an electrically conductive microlith catalyst element with electrical leads attached.

The present invention is further described in connection with the drawings. As shown in FIG. 1, in one preferred embodiment a microlith catalyst element 10 comprises a plurality of square flow channels 11 with electrical leads 15 connected to bus bars 16. Bus bars 16 are welded at a forty five degree to metallic flow channel walls 12 to ensure even heating of catalyst 10. Advantageously, catalyst element 10 is in the form of a catalytic metal screen of at least about 400 flow channels per square centimeter with a wire diameter sufficiently small to yield an open area of at least about 70 percent. Using the power of a standard automotive battery the catalyst may be brought to an effective operating temperature in less than one second, often in significantly less than 0.50 seconds. Thus in automotive exhaust gas service, electrical power need not be applied till just after start of cranking thus limiting maximum drain on the battery. Advantageously, electrical power is applied prior to termination of engine cranking. Typically, an automotive microlith catalyst element is heated to an effective operating temperature within one to two seconds of start of cranking. This rapid heating is important in that no delay in engine starting is required to achieve emissions control. Typical reactors may have from one to ten or more such microliths.

Figure 2:
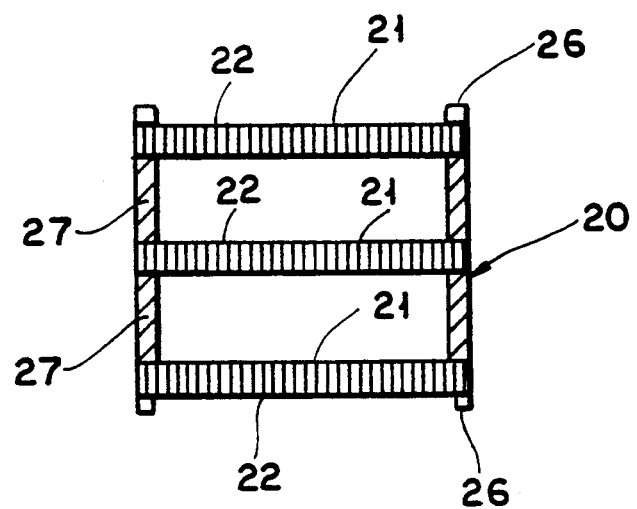
FIG. 2 shows a cross sectional view of a three element microlith catalyst.

FIG. 2 shows a sectional view of a three element microlithic catalyst reactor 20 suitable for either automotive exhaust gas treatment or for catalytic combustor service. Microlith catalyst elements 21 having 400 flow channels per square centimeter are spaced apart a distance equal to or greater than the length of the flow paths 22 to provide for some mixing of gases flowing between elements 21. Catalyst elements 21 are held in reactor 20 by retaining rings 26 and separated from each other by spacers 27. A microlith catalyst reactor such as shown in FIG. 2, depending on the application, may contain any desired number of microlith elements. With fine wire microlith screens, as many as one hundred or more can readily be placed in a one inch long reactor.

The microlith catalysts of the present invention are readily made using known catalytic agents. The following examples describe means of making microlith catalysts but are not to be construed as limiting. An microlith catalyst as per figure one is made by vacuum sputtering platinum onto a stainless steel screen which has been cleaned by heating in air to 750 K. Typically the platinum coating may be thinner than 100 angstroms but may be thicker for greater catalyst life. Advantageously, a similarly thin layer of ceria or alumina may be deposited prior to deposition of the platinum. Catalysts containing palladium, iridium, rhodium or other metals can be similarly prepared. In many applications, especially with electrical heating, a wire screen formed from stainless steel or other alloy is a sufficiently active catalyst without additional coating. Although metal microliths are preferred, ceramic microliths can be made such as by slicing of ceramic honeycomb extrudates prior to firing. Such ceramic honeycomb extrudates advantageously may contain an organic binder to facilitate production of thin slices. However, ceramic microliths are most advantageously in the form of fiber mats or screens composed of long fibers spun from any desired ceramic composition, preferably catalytic ceramics. As necessary for sufficient low temperature catalytic activity, ceramic and metal microliths may be catalyzed using various techniques well known in the art.

EXAMPLE I

A three element catalytic microlith automotive exhaust reactor having about 2500 flow channels per square centimeter is constructed using a five centimeter wide strip of 70% open area screening of platinum coated stainless steel wires having a diameter of 0.03 mm spaced 0.20 mm apart and installed in the exhaust pipe of a four cylinder automotive engine. During engine cranking electrical power from the battery is applied heating the microlith catalyst elements to a temperature of 700 degrees Kelvin within one second whereby hydrocarbon emissions are controlled during initial operation of the engine.

EXAMPLE II

An electrically heated ten element microlith catalytic combustor is constucted using a screen fabricated with 0.076 mm wires of Kanthal. Ambient temperature air is passed through the reactor at a flow velocity greater than the laminar flame velocity of the fuel to be burned. The catalyst is then heated electrically to a temperature of 1000 degrees Kelvin and an intimate admixture of fuel and air is formed by spraying jet fuel into the air passing into the reactor. Plug flow combustion of the fuel is achieved.

EXAMPLE III

A fume abatement reactor six centimeters in length is constructed using 300 microlith elements of screening with about thirty 0.050 mm wires of platinum coated nichrome per centimeter (nominally 900 flow channels per square centimeter). Fumes containing 50 ppm by volume of benzene in air are preheated to 700 degrees Kelvin and passed through the microlith reactor. Better than 99.9 percent conversion of the benzene is achieved.

What is claimed is:

1. The method of controlling automotive emissions during less than about five seconds of initial engine operation wherein engine exhaust gases are contacted with a microlith catalytic element having flow channels with flow paths less than about two millimeters and having a ratio of channel length to channel diameter of less than about five to one.

2. The method of claim 1 wherein said microlith catalyst element is the initial catalytic element in a reaction system comprising a multiplicity of catalytic elements.

3. The method of claim 2 wherein said microlith catalyst element is mounted at the exit of the engine exhaust manifold.

4. The method of claim 1 wherein said microlith catalyst element is electrically conductive and comprises the additional step of electrically heating said catalyst element prior to termination of engine cranking.

5. The method of claim 4 wherein said catalyst element reaches an operating temperature within the range of from 550° Kelvin to 1500° Kelvin within two seconds of start of engine cranking.

6. The method of claim 1 wherein said microlith catalyst element is mounted within the engine exhaust manifold.

7. The method of combusting a carbonaceous fuel wherein said fuel is combusted by passage of an admixture of said fuel with air through a reactor comprising a microlith catalyst element heated to a temperature within the range of from 550° Kelvin to 1500° Kelvin, said element having flow channels with flow passages shorter than one mm in length.

8. The method of claim 7 wherein said catalyst element is brought to said range of temperature by electrical heating.

9. The method of claim 7 wherein the temperature of said catalyst element is at least about 1000 degrees Kelvin.

10. The method of claim 7 wherein said admixture is a gaseous fume and said reactor comprises a multiplicity of microlith elements.

11. The method of claim 7 wherein said flow passages are shorter than 0.5 mm in length.

12. The method of claim 11 wherein said reactor comprises a multiplicity of microlith catalyst elements.

* * * * *

UNITED STATES PATENT AND TRADEMARK OFFICE
CERTIFICATE OF CORRECTION

PATENT NO. : 5,342,591
DATED : August 30, 1994
INVENTOR(S) : William C. Pfefferle It is certified that error appears in the above-indentified patent and that said Letters Patent is hereby corrected as shown below:

Col. 2, line 34; "nun" should read -- mm -- .

Signed and Sealed this

First Day of November, 1994

Attest:

BRUCE LEHMAN

*Attesting Officer*  *Commissioner of Patents and Trademarks*